United States Patent
Otsuki

(10) Patent No.: US 7,209,254 B2
(45) Date of Patent: Apr. 24, 2007

(54) PRINTING SYSTEM, ORDER ACCEPTANCE SERVER, ORDER ACCEPTANCE SYSTEM, METHOD OF ACCEPTING AN ORDER, METHOD OF ORDER, AND RECORDING MEDIUM

(75) Inventor: Koichi Otsuki, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 893 days.

(21) Appl. No.: 10/230,359

(22) Filed: Aug. 29, 2002

(65) Prior Publication Data

US 2003/0076530 A1    Apr. 24, 2003

(30) Foreign Application Priority Data

Aug. 20, 2001  (JP) .............................. 2001-262055

(51) Int. Cl.
*G06F 15/00* (2006.01)

(52) U.S. Cl. ....................... 358/1.15; 705/26

(58) Field of Classification Search ............... 358/1.15, 358/1.9, 498, 1.17; 400/692–693; 271/272, 271/314; 399/12–13, 24, 27

See application file for complete search history.

(56) References Cited

U.S. PATENT DOCUMENTS

| | | | |
|---|---|---|---|
| 6,024,505 A * | 2/2000 | Shinohara | 400/605 |
| 6,798,997 B1 * | 9/2004 | Hayward et al. | 399/12 |
| 2002/0054340 A1 | 5/2002 | Tokutomi et al. | |

* cited by examiner

*Primary Examiner*—King Y. Poon
*Assistant Examiner*—Saeid Ebrahimi
(74) *Attorney, Agent, or Firm*—Sughrue Mion, PLLC

(57) ABSTRACT

There is realized a printing system, an order-receiving server, an order-receiving system, an order-receiving method, an order-sending method, and a storage medium, capable of making it convenient for a person making an order upon ordering a printing-medium unit. A printing system for printing on a printing medium, comprises: a printing-medium unit comprising the printing medium, and a memory, the memory having printing-medium information relating to the printing medium recorded thereon. The printing system: reads-in the printing-medium information; and sends-out the printing-medium information to a telecommunication line towards an order-receiving server for receiving an order for the printing-medium unit.

25 Claims, 14 Drawing Sheets

336

| ADDRESS | CONTENTS OF INFORMATION |
|---|---|
| 00H | PAPER LENGTH |
| 01H | PAPER WIDTH |
| 02H | PAPER THICKNESS |
| 03H | PAPER SURFACE QUALITY |
| 04H | PAPER COLOR |
| 05H | PAPER PATTERN |
| 06H | PRODUCT ID NUMBER |
| ⋮ | ⋮ |

FIG. 5

PRINTING SYSTEM, ORDER ACCEPTANCE SERVER, ORDER ACCEPTANCE SYSTEM, METHOD OF ACCEPTING AN ORDER, METHOD OF ORDER, AND RECORDING MEDIUM

The present application claims priority upon Japanese Patent Application No. 2001-262055 filed on Aug. 30, 2001, which is herein incorporated by reference.

BACKGROUND OF THE INVENTION

1. Field of the Invention

The present invention relates to a printing system, an order-receiving server, an order-receiving system, an order-receiving method, an order-sending method, and a storage medium.

2. Description of the Related Art

There are patterns of supplying printing media, such as printing paper and films for printing, to discrete printers or to various kinds of printing systems comprising a printer and a computer connected to the printer, such as an inkjet printer, an inkjet printer and a computer connected thereto, a laser-beam printer, and a laser-beam printer and a computer connected thereto: a supplying pattern using, for example, cut sheets having previously been cut into predetermined sizes; and, a supplying pattern using printing-media units such as roll-paper units comprising a core and roll paper, such as printing paper, wound around the outer periphery of the core.

Here, the above-mentioned roll paper has different aspects from cut sheets etc. This is that the specifications etc. of the roll paper expected by a user largely differ according to, for example, the user's purpose of usage or the object of usage of the roll paper. For example, in the case of printing a drop curtain having a length of several meters, there is a need to use a considerably long roll paper having a length corresponding to the length of the drop curtain multiplied by the number of printed sets. Further, in order to avoid spoiling of appearance caused by unwanted margins or blanks formed on the printed matter, there is a need to use roll paper having a width suitable with the width of the print image. Furthermore, in the case of printing, for example, posters or postcards, even if plain paper is to be used for test printing, there is a need to use, for example, exclusive-use glossy paper upon printing a finished product, when attaching importance to printing quality. Therefore, the user will buy and use various kinds of roll paper according to the object of usage etc.

On the other hand, as a result of recent development in Internet-related technology etc., there have appeared many product-purchasing patterns, different from a pattern of making a purchase at shops such as retailers, in which accessing is made from a computer provided at home, in office etc. to, for example, a homepage of a product supplier through the Internet and products are purchased through the homepage.

As explained above, since the roll-paper specifications etc. expected by the user largely differ according to the roll-paper usage etc., in case the user is to order roll paper, there is a need to designate in detail the specifications etc. of the roll paper. Further, in order to make the designation in the above-mentioned Internet-involving product-purchasing pattern, the user will have to make a one-by-one selection, from a browser provided in the computer, in view of a plurality of kinds of options provided respectively for the specifications etc. for a plurality of kinds of roll paper, in accordance with the specifications etc. that he/she is expecting. The roll paper to be ordered is determined in this way. When considering the user's convenience, this kind of complicated operation should be avoided wherever possible. In order to do so, improvement in the user interface, such as product-ordering display screen, is expected.

However, if many options are provided in order to broaden the variation of products, there will arise a problem in that the user will have trouble in finding the appropriate option suiting the specifications etc. he/she is expecting.

Further, even in the case of making a new order so as to continuously use roll paper having the same specifications etc. as those of the roll paper currently in use, it will be necessary to make a selection for each of the plurality of kinds of options respectively provided for the specifications etc. for a plurality of kinds of roll paper. This will be inconvenient for the user.

SUMMARY OF THE INVENTION

The present invention has been contrived in view of the above problems, and an object thereof is to realize a printing system, an order-receiving server, an order-receiving system, an order-receiving method, an order-sending method, and a storage medium, capable of making it convenient for a person making an order upon ordering of a printing-medium unit.

A main invention is a printing system for printing on a printing medium, comprising:
  a printing-medium unit comprising
    the printing medium, and
    a memory, the memory having printing-medium information relating to the printing medium recorded thereon;
  wherein the printing system
    reads-in the printing-medium information, and
    sends-out the printing-medium information to a telecommunication line towards an order-receiving server for receiving an order for the printing-medium unit.

Other features of the present invention will become clear by the description of the present specification and the accompanying drawings.

BRIEF DESCRIPTION OF THE DRAWINGS

For a more complete understanding of the present invention and the advantages thereof, reference is to be made to the following description and the accompanying drawings wherein:

FIG. 5 is a diagram showing a data arrangement in a memory cell 336 provided in the storage element 33;

DESCRIPTION OF THE PREFERRED EMBODIMENTS

Figure 1:
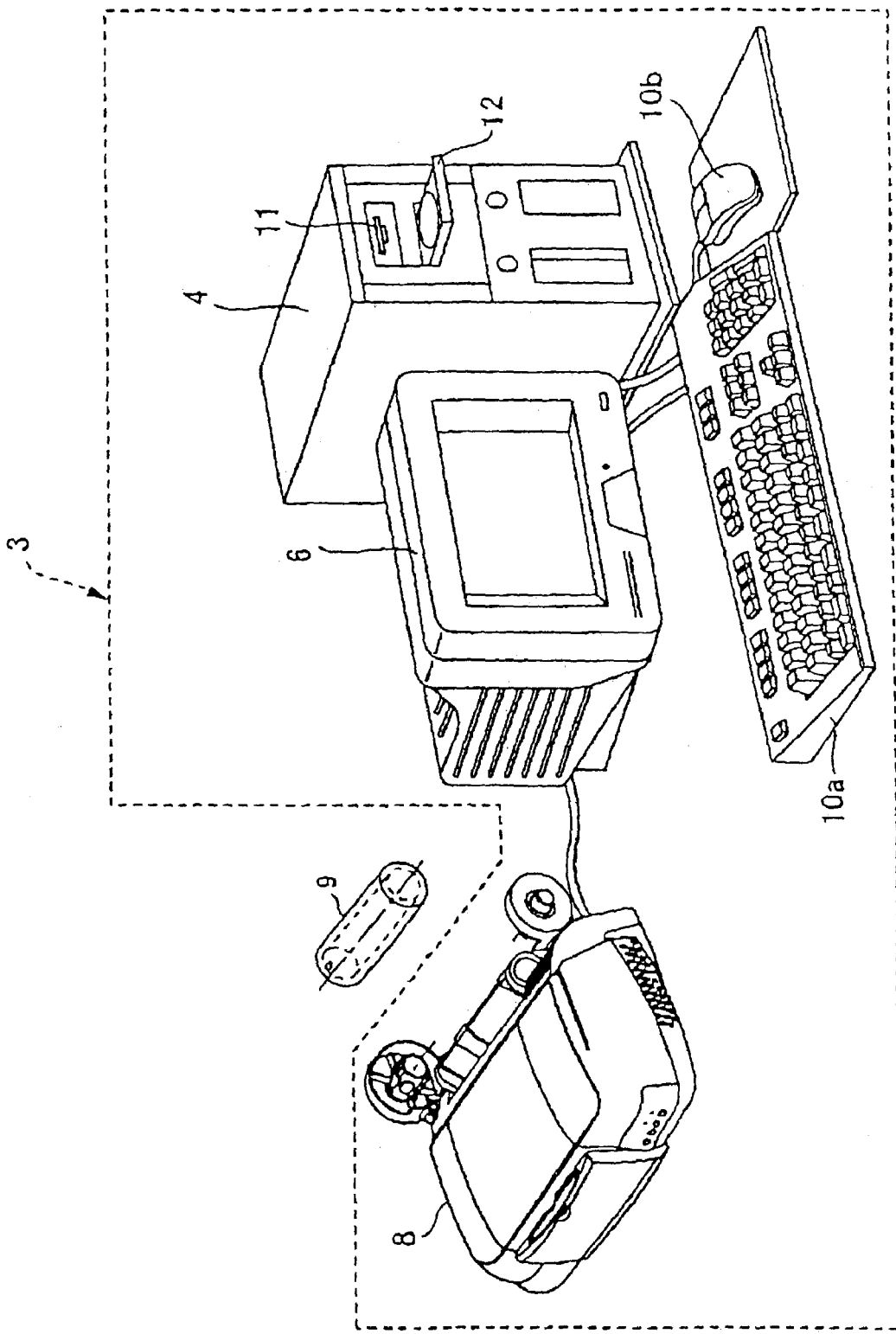
FIG. 1 is an explanatory diagram showing an outer structure of a printing system according to an embodiment.

At least the following matters will be made clear by the description of the present specification and the accompanying drawings.

A printing system for printing on a printing medium, comprises:
  a printing-medium unit comprising
    the printing medium, and
    a memory, the memory having printing-medium information relating to the printing medium recorded thereon;
  wherein the printing system
    reads-in the printing-medium information, and
    sends-out the printing-medium information to a telecommunication line towards an order-receiving server for receiving an order for the printing-medium unit.

By sending-out the printing-medium information to a telecommunication line towards an order-receiving server for receiving an order for the printing-medium unit, a supplier of the printing-medium unit that has received the information from a user can obtain the information relating to the printing medium which is the object being ordered.

(First Effect)

The printing-medium information may be specification information indicating a specification of the printing medium.

In this case, the specification information itself, that indicates the specification of the printing medium, is sent. Thus, a further effect is achieved in that the supplier receiving the information does not have to possess that information in advance.

(Second Effect)

The printing system may receive, from the order-receiving server through the telecommunication line, screen-structuring data of an ordering screen for ordering the printing-medium unit,
  the data
    being generated by the order-receiving server, and
    having, as initial data, the specification indicated by the specification information.

Accordingly, the user will be freed from the inconvenience in that he/she has to make a selection for each and every one of the plurality of kinds of options provided for the respective specifications of the plurality of kinds of roll paper, in a case where he/she is, for example, to newly order a roll paper having the same specifications as those of the roll paper currently being used.

(Third Effect)

The initial data may be rewritable, and
  the printing system may send-out, to the telecommunication line towards the order-receiving server, either
    rewritten data if the initial data has been rewritten, or
    information indicating that the initial data has not been rewritten if the initial data has not been rewritten.

Accordingly, the user can make an order according to a simple method, in the case where the user is to newly order a new roll-paper unit having the same or slightly different specifications etc. as those of the roll paper currently being used.

(Fourth Effect)

The printing-medium information may be ID information for individually specifying the printing medium.

In this case, since the ID information for individually specifying the printing medium is sent, it becomes possible to reduce the amount of information stored in the memory of the printing-medium unit. Furthermore, it becomes possible to reduce the information amount to be sent-out to the order-receiving server.

(Fifth Effect)

The printing system may receive, from the order-receiving server through the telecommunication line, screen-structuring data of an ordering screen for ordering the printing-medium unit,
  the screen-structuring data
    (1) being generated by the order-receiving server having specification information indicating a specification of the printing medium for every ID information, and
    (2) having, as initial data, the specification corresponding to the ID information.

Accordingly, it becomes possible to realize a printing system achieving the same effect as the third effect.

The initial data may be rewritable, and
  the printing system may send-out, to the telecommunication line towards the order-receiving server, either
    rewritten data if the initial data has been rewritten, or
    information indicating that the initial data has not been rewritten if the initial data has not been rewritten.

Accordingly, it becomes possible to realize a printing system achieving the same effect as the fourth effect.

An order-receiving server for receiving an order for a printing-medium unit:
  receives the order for the printing-medium unit which is attachable/detachable to/from a printing system, the printing-medium unit comprising
    a printing medium on which printing is carried out by the printing system, and
    a memory for recording printing-medium information relating to the printing medium and which is read into the printing system; and
  receives the printing-medium information from the printing system through a telecommunication line.

Accordingly, it becomes possible to realize an order-receiving server achieving the same effect as the first effect.

The printing-medium information may be specification information indicating a specification of the printing medium.

Accordingly, it becomes possible to realize an order-receiving server achieving the same effect as the second effect.

The order-receiving server may
  generate screen-structuring data of an ordering screen for ordering the printing-medium unit, and send-out the screen-structuring data to the telecommunication line towards the printing system, the screen-structuring data having, as initial data, the specification indicated by the specification information received from the printing system.

Accordingly, it becomes possible to realize an order-receiving server achieving the same effect as the third effect.

The order-receiving server may receive, from the printing system through the telecommunication line, either rewritten data if the initial data has been rewritten in the printing system, or information indicating that the initial data has not been rewritten if the initial data has not been rewritten in the printing system.

Accordingly, it becomes possible to realize an order-receiving server achieving the same effect as the fourth effect.

The printing-medium information may be ID information for individually specifying the printing medium.

Accordingly, it becomes possible to realize an order-receiving server achieving the same effect as the fifth effect.

The order-receiving server may (1) have specification information indicating a specification of the printing medium for every ID information, (2) generate screen-structuring data of an ordering screen for ordering the printing-medium unit, the data having, as initial data, the specification corresponding to the ID information received from the printing system, and (3) send-out the screen-structuring data to the telecommunication line towards the printing system.

Accordingly, it becomes possible to realize an order-receiving server achieving the same effect as the third effect.

The order-receiving server may receive, from the printing system through the telecommunication line, either rewritten data if the initial data has been rewritten in the printing system, or information indicating that the initial data has not been rewritten if the initial data has not been rewritten in the printing system.

Accordingly, it becomes possible to realize an order-receiving server achieving the same effect as the fourth effect.

An order-receiving system for a printing-medium unit, comprises:

a printing system for printing on a printing medium, wherein (1) the printing-medium unit is attachable/detachable to/from the printing system, the unit comprising the printing medium and a memory, (2) the printing system reads-in printing-medium information relating to the printing medium and recorded on the memory, (3) the printing system carries out printing on the printing medium, and (4) the printing system sends-out the printing-medium information to a telecommunication line towards an order-receiving server for receiving an order for the printing-medium unit; and the order-receiving server for receiving the printing-medium information from the printing system through the telecommunication line.

A method of receiving an order for a printing-medium unit, comprises the steps of:

a printing system for printing on a printing medium sending-out printing-medium information to a telecommunication line towards an order-receiving server for receiving an order for the printing-medium unit, wherein (1) the printing-medium unit is attachable/detachable to/from the printing system, the unit comprising the printing medium and a memory, (2) the printing system reads-in the printing-medium information relating to the printing medium and recorded on the memory, and (3) the printing system carries out printing on the printing medium; and the order-receiving server receiving the printing-medium information from the printing system through the telecommunication line.

A method of sending an order for a printing-medium unit, comprises the steps of:

a printing system for printing on a printing medium reading-in printing-medium information relating to the printing medium and recorded on a memory provided on the printing-medium unit; and sending-out the printing-medium information to a telecommunication line towards an order-receiving server for receiving an order for the printing-medium unit.

Accordingly, it becomes possible to realize an order-sending method achieving the same effect as the first effect.

The printing-medium information may be specification information indicating a specification of the printing medium.

Accordingly, it becomes possible to realize an order-sending method achieving the same effect as the second effect.

The printing-medium information may be ID information for individually specifying the printing medium.

Accordingly, it becomes possible to realize an order-sending method achieving the same effect as the fifth effect.

A storage medium has an order-sending program for sending an order for a printing-medium unit recorded thereon in a computer-readable manner. The order-sending program makes a printing system execute the following steps of:

the printing system for printing on a printing medium reading-in printing-medium information relating to the printing medium and recorded on a memory provided on the printing-medium unit; and sending-out the printing-medium information to a telecommunication line towards an order-receiving server for receiving an order for the printing-medium unit.

Accordingly, it becomes possible to realize a storage medium achieving the same effect as the first effect.

The printing-medium information may be specification information indicating a specification of the printing medium.

Accordingly, it becomes possible to realize a storage medium achieving the same effect as the second effect.

The order-sending program may further make the printing system execute the following step of:

the printing system receiving, from the order-receiving server through the telecommunication line, screen-structuring data of an ordering screen for ordering the printing-medium unit, the data being generated by the order-receiving server, and having, as initial data, the specification indicated by the specification information.

Accordingly, it becomes possible to realize a storage medium achieving the same effect as the third effect.

The initial data may be rewritable, and
the order-sending program may further make the printing system execute the following step of:
the printing system
sending-out, to the telecommunication line towards the order-receiving server, either
rewritten data if the initial data has been rewritten, or
information indicating that the initial data has not been rewritten if the initial data has not been rewritten.

Accordingly, it becomes possible to realize a storage medium achieving the same effect as the fourth effect.

The printing-medium information may be ID information for individually specifying the printing medium.

Accordingly, it becomes possible to realize a storage medium achieving the same effect as the fifth effect.

The order-sending program may further make the printing system execute the following step of:
the printing system
receiving, from the order-receiving server through the telecommunication line, screen-structuring data of an ordering screen for ordering the printing-medium unit, the screen-structuring data
(1) being generated by the order-receiving server having specification information indicating a specification of the printing medium for every ID information, and
(2) having, as initial data, the specification corresponding to the ID information.

Accordingly, it becomes possible to realize a storage medium achieving the same effect as the third effect.

The initial data may be rewritable, and
the order-sending program may further make the printing system execute the following step of:
the printing system
sending-out, to the telecommunication line towards the order-receiving server, either
rewritten data if the initial data has been rewritten, or
information indicating that the initial data has not been rewritten if the initial data has not been rewritten.

Accordingly, it becomes possible to realize a storage medium achieving the same effect as the fourth effect.

Schematic Structure of Printing System

First, explanation will be made of a schematic structure of a printing system according to the present embodiment with reference to FIG. 1 and FIG. 2.

Figure 2:
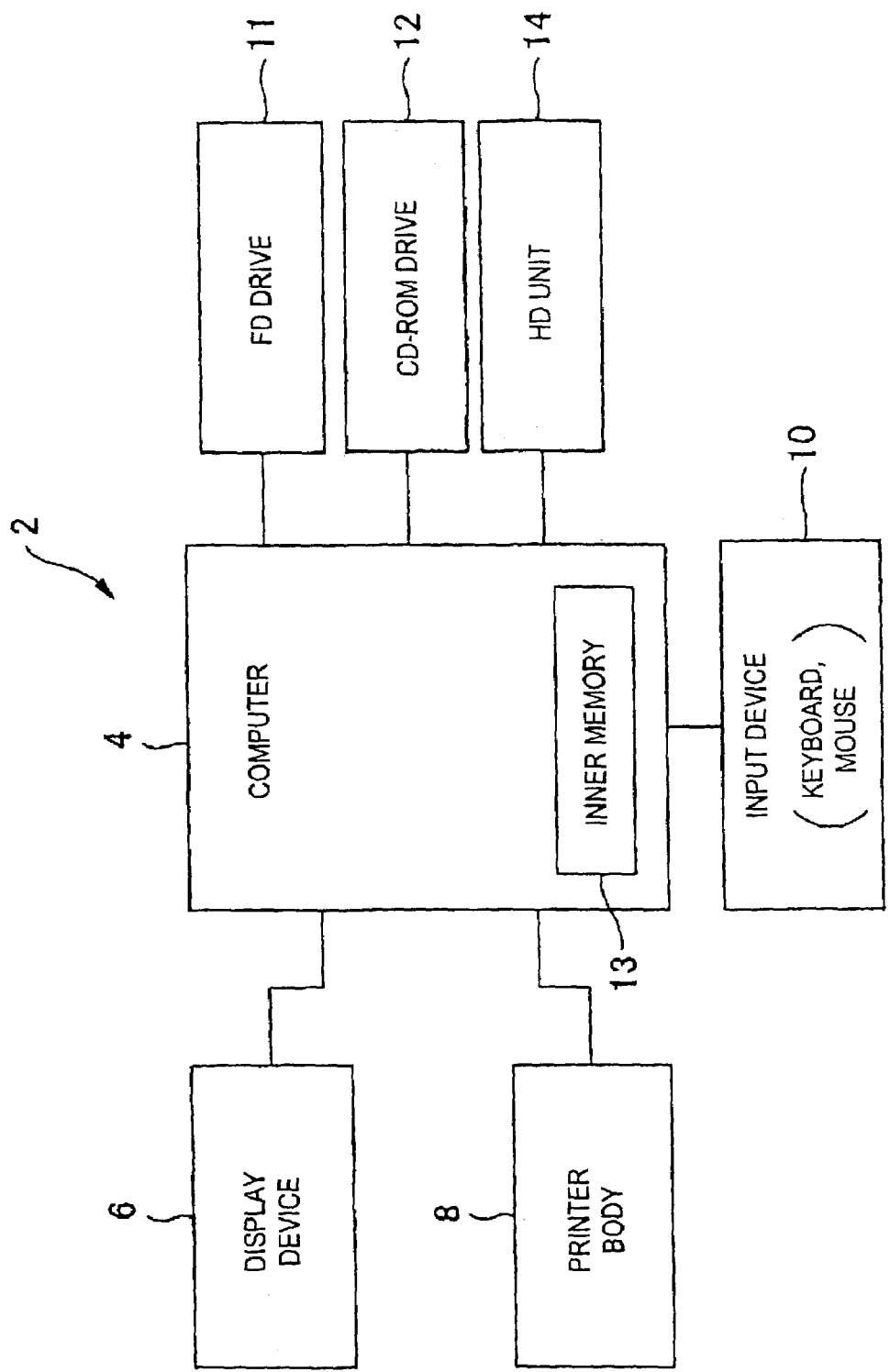
FIG. 2 is a block diagram showing a structure of the printing system shown in FIG. 1.

FIG. 1 is an explanatory diagram showing an outer structure of a printing system according to the present embodiment, and FIG. 2 is a block diagram showing a structure of the printing system shown in FIG. 1.

In FIG. 1, there are shown: a printing system 3, and a printing-medium unit 9 such as a roll-paper unit which is attachable/detachable to/from the printing system 3. Further, the above-mentioned printing system 3 comprises: a computer body 4 accommodated in an enclosure of, for example, a mini-tower type; a display device 6 such as a CRT (cathode ray tube), plasma display, or a liquid crystal display; a printer body 8 serving as a record-outputting device; a keyboard 10a and a mouse 10b serving as an input device; a flexible disk drive device 11; and a CD-ROM drive device 12.

FIG. 2 shows the structure of the printing system 3 as a block diagram. In the enclosure in which the computer body 4 is accommodated, there are further provided: an inner memory 13 such as a RAM (random access memory); and an outer memory such as a hard disk drive unit 14.

Note that in the above explanation, explanation was made of an example of structuring the computer system by connecting the printer body 8 to the computer body 4, the display device 6, the input device 10, the flexible disk drive device 12, and the CD-ROM drive device 12. However, it is possible to make the printer body 8 have some of the functions or mechanisms respectively possessed by the computer body 4, the display device 6, the input device 10, the flexible disk drive device 12, and the CD-ROM drive device 12. For example, the structure may be that the printer body 8 has an image processing section for processing an image, a displaying section for various kinds of displaying, and a recording-media-attaching/detaching section for attaching/detaching a recording medium on which image data taken by, for example, a digital camera is recorded.

Further, the above-mentioned printing system 3 only needs to have a least possible structure for realizing functions for printing on a printing medium. Therefore, the above-mentioned display device 6, the keyboard 10a and the mouse 10b serving as the input device, the flexible disk drive device 11, the CD-ROM drive device 12, the inner memory 13 such as the RAM (random access memory), and the outer memory such as the hard disk drive unit 14 are not essential structural components; but the printing system 3 only needs to have the printer body 8 and the computer body 4 connected thereto, or a printer body having some of the functions of the computer body 4.

Schematic Structure of Printer Body and Printing-Medium Unit

Figure 3:
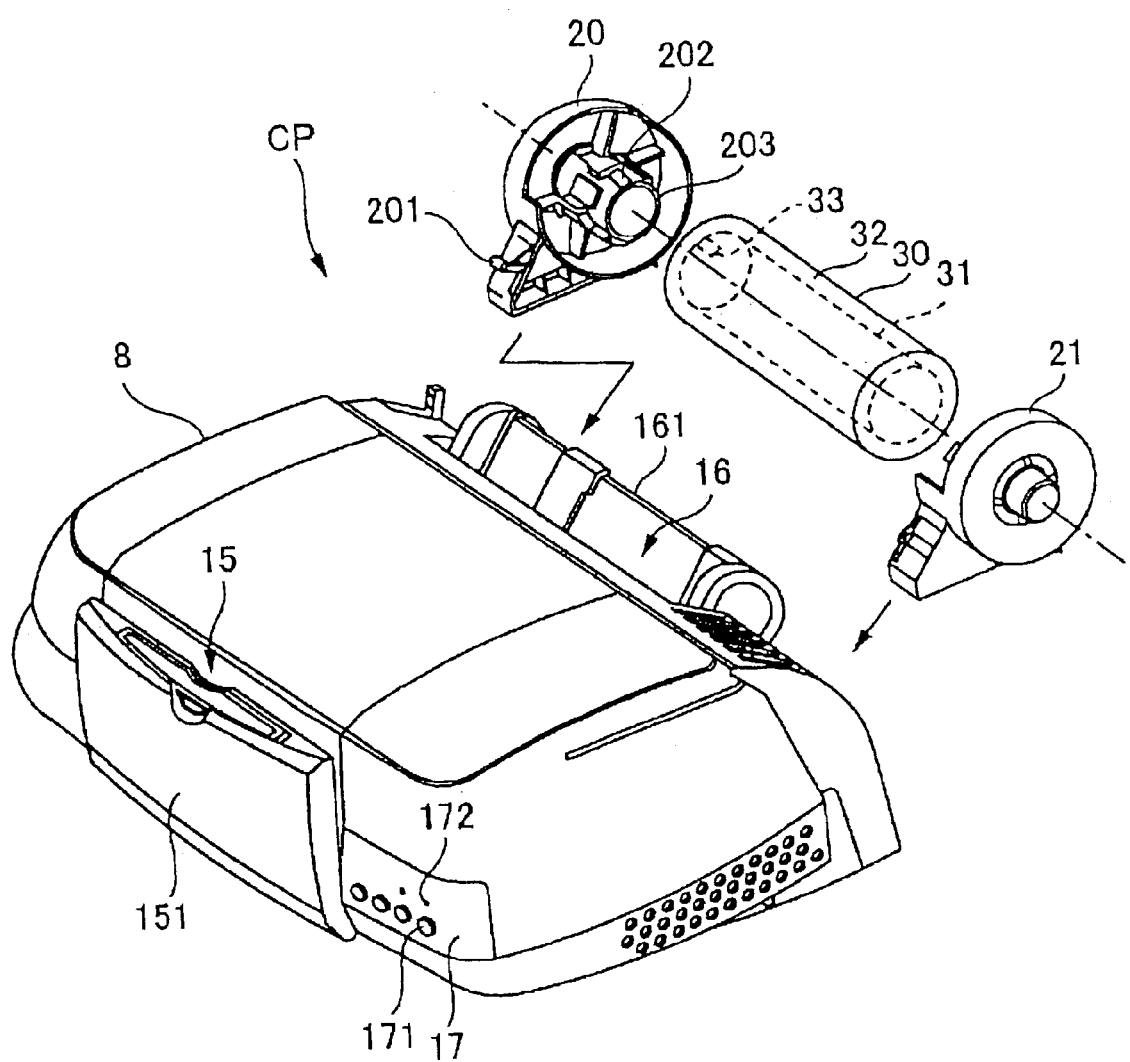
FIG. 3 is an explanatory diagram showing a color printer CP as an example of a printer having a printer body 8 and a printing-medium unit 9.

FIG. 3 shows a color printer CP as an example of a printer having a printer body 8 and a printing-medium unit 9. Further, a roll-paper unit 30 is shown as an example of the printing-medium unit 9.

The color printer CP is a printer that can output color images, and is an inkjet-type printer that forms an image by ejecting colored inks in, for example, four colors, i.e., cyan (C), magenta (M), yellow (Y), and black (K) onto a printing medium such as a roll paper and forming dots therewith. Note that, regarding the colored inks, it is possible to use light cyan (pale cyan, LC), light magenta (pale magenta, LM), and dark yellow (dim yellow, DY) other than the above-mentioned four colors.

As shown in FIG. 3, the color printer CP has a structure of discharging a printing medium, such as a printing paper, having been supplied from the back of the printer from the front side thereof. An operation panel 17 and a paper-discharging section 15 are provided on the front surface of the printer body 8; and a paper-supplying section 16 is provided on the back of the printer 8. The operation panel 17 comprises various operation buttons 171 and indicator lamps 172. The paper-discharging section 15 comprises a paper-discharging tray 151 that covers the paper-discharging port when not in use.

The paper-supplying section 16 comprises a paper-supplying holder 161 for holding cut sheets (not shown), and roll-paper-unit holders 20, 21 for holding the roll-paper unit 30.

The roll-paper unit 30 comprises: a core 31; print roll paper 32 which is wrapped around the outer periphery of the core 31; and a storage element (storage member) 33 serving as a memory and provided on the inner periphery of the core 31. The details of the storage element 33 will be described later on.

The roll-paper-unit holders 20, 21 are arranged on both sides at the back of the printer body 8 so as to form a pair. One of the roll-paper-unit holders 20, 21, the roll-paper-unit holder 20 in the present embodiment, comprises: an electrical contact point 201 with the printer body 8; and a transmitting/receiving section 202 for transmitting/receiving data to/from the storage element 33 of the roll-paper unit 30 and electrically connected to the electrical contact point 201. Note that in FIG. 3, in order to show both the contact point 201 and the transmitting/receiving section 202 provided on the roll-paper-unit holder 20, the roll-paper-unit holders 20, 21 are shown in a state detached from the printer body 8 and the roll-paper unit 30.

Structure of Storage Element 33

Figure 4:
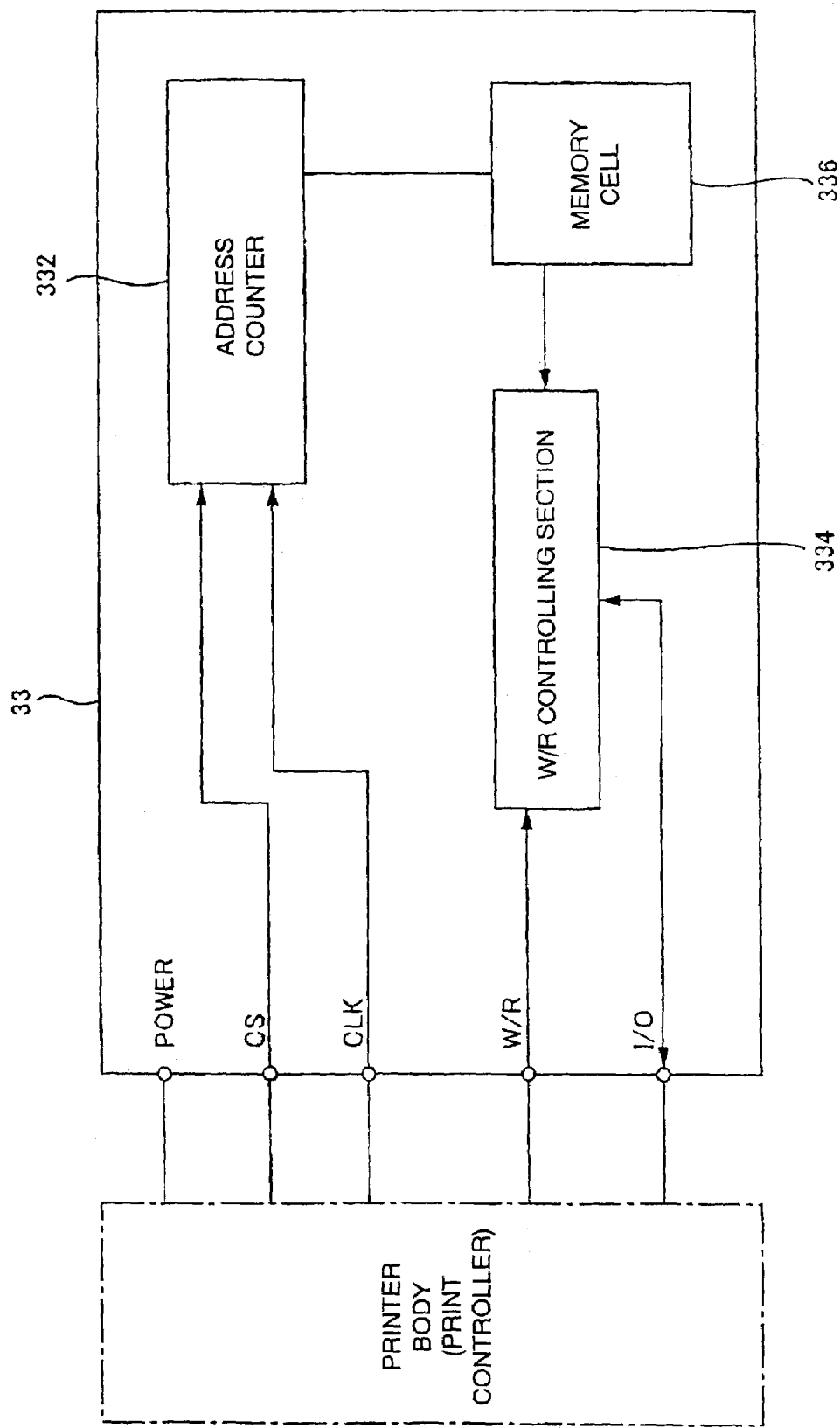
FIG. 4 is a block diagram showing the structure of a storage element 33.

Next, explanation will be made of the structure of the storage element 33 with reference to FIG. 4 and FIG. 5. FIG. 4 is a block diagram showing the structure of the storage element 33. FIG. 5 is a diagram showing data arrangement in a memory cell 336 provided in the storage element 33.

As shown in FIG. 4, the storage element 33 has: the memory cell 336; a W/R controlling section 334 for controlling reading-in and writing-in of data from/to the memory cell 336; and an address counter 332 that designates an address within the memory cell 336 according to a clock signal CLK upon reading-in or writing-in of data with the W/R controlling section 334. Note that the W/R controlling section 334 reads-in and writes-in data in serial.

As shown in FIG. 5, the memory cell 336 has a region in which data is readable and rewritable. In this region, there is stored specification information on the specifications of the printing medium, such as: paper-length information; paper-width information; paper-thickness information; paper-surface-quality information; paper-color information; and paper-pattern information. Further, in the above-mentioned region, a product-ID number is stored as an example of ID information for individually specifying the printing medium.

Note that the above-mentioned pieces of information are shown in FIG. 5 as typical examples of printing-medium information. However, the information is not to be limited to the above, and the information may be any kind of information on the printing medium. In a broad sense, the number of printing-medium units ordered may be included upon ordering of printing-medium units.

Further, regarding the specification information indicating the specifications of the printing medium and the ID information for individually specifying the printing medium, it is not necessary to store both pieces of information. That is, either the former or the latter will do.

Additional explanation will be made of the respective terms shown in the regions of FIG. 5. The paper-length information is information relating to the lengthwise width of the paper. The paper-width information is information relating to the width of the paper. The paper-thickness information is information relating to the thickness of the paper. The paper-surface-quality information is information relating to the surface quality of paper, such as glossiness of the paper surface. The paper-color information is information relating to the color of the to-be-printed surface of the paper. The paper-pattern information is information relating to the patterns, such as designs and markings, on the to-be-printed surface of the paper. The product-ID number is an ID number for distinguishing the individual products.

Generally, the above-mentioned information is written-in before the roll-paper unit 30 is set on the printer body 8, and for example, upon manufacturing of the roll-paper unit 30 at a factory and. Further, although not shown, it is possible to store information that can be rewritten or written-in after setting the roll-paper unit 30 on the printer body 8, such as the date on which the printing medium was started to be used or the like.

Note that, as for the storage element 33, it is possible to use a noncontact-type storage element that does not require contact between the storage element 33 and the transmitting/receiving section 202 upon data transmitting/receiving, or, a contact-type storage element on the assumption that the two components will contact.

Inner Structure of Control Circuit of Color Printer CP

Figure 6:
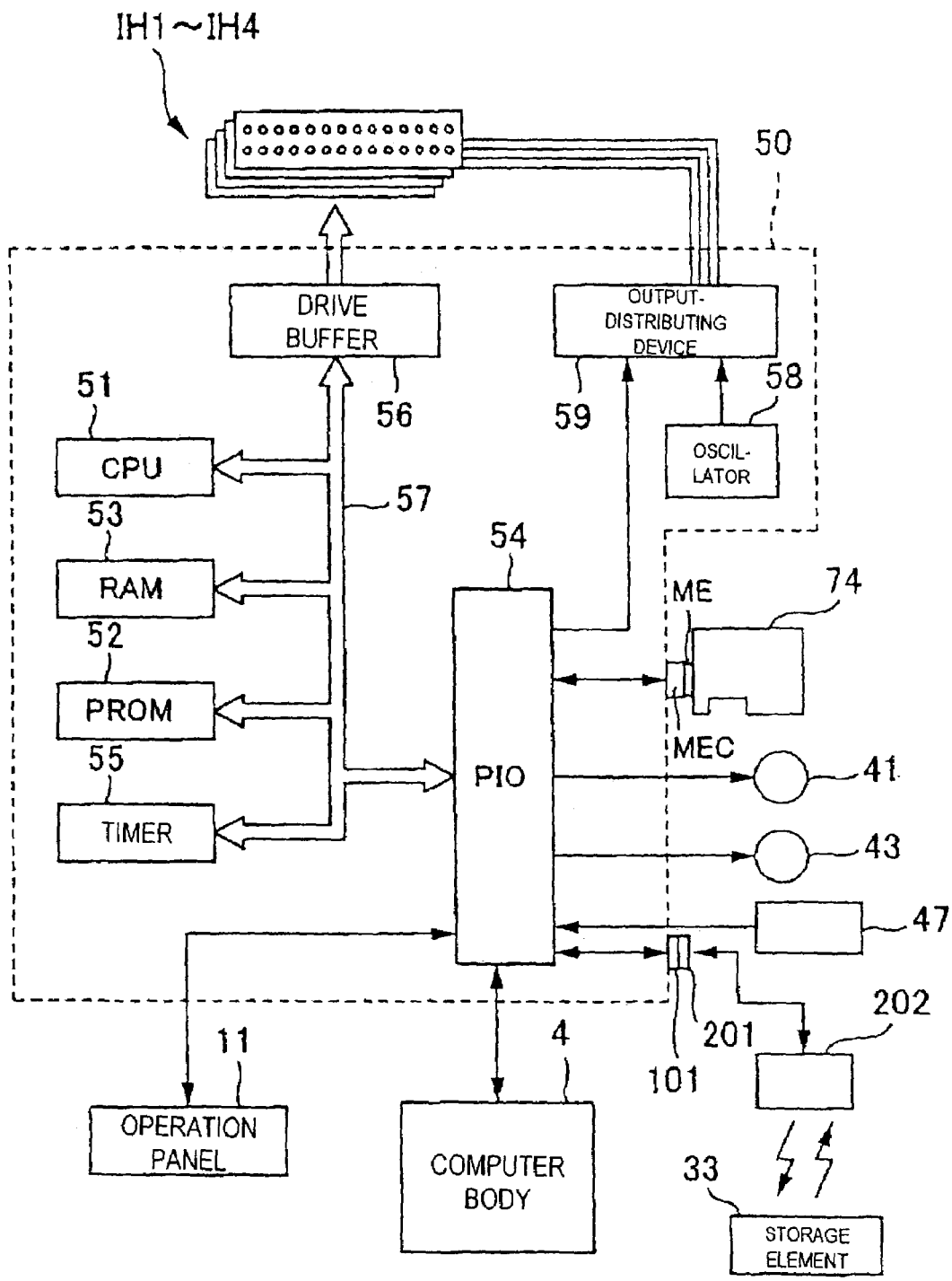
FIG. 6 is a block diagram showing the inner structure of a control circuit of the color printer CP according to the embodiment.

Next, explanation will be made of an inner structure of a control circuit of the color printer CP with reference to FIG. 6. FIG. 6 is a block diagram showing the inner structure of the control circuit of the color printer CP according to an embodiment.

As shown in the figure, inside the control circuit 50 there are provided, for example: a CPU 51; a PROM 52; a RAM 53; an input/output section for peripheral equipments (PIO) 54; a timer 55; and a drive buffer 56.

To the PIO 54, there are connected: the computer body 4; a contact point MEC for a memory element ME of an ink unit; a carriage motor 41; a paper-feed motor 43; an encoder 47; and the transmitting/receiving section 202 via contact points 101 and 202. The drive buffer 56 is used as a buffer for feeding, to ink-ejecting heads IH1 through IH4, on/off signals for forming dots. The above components are connected to each other via a bus 57, and are made so that data can mutually be exchanged. Further, the control circuit 50 comprises: an oscillator 58 that outputs a drive waveform at a predetermined frequency; and an output distributing device 59 that distributes the output from the oscillator 58 to the ink-ejecting heads IH1 through IH4 at predetermined timings.

The control circuit 50 accesses the storage element 33 provided on the core 31 of the roll-paper unit 30 via the transmitting/receiving section 202. The control circuit 50 either controls a printing process in accordance with the information obtained from the storage element 33, or sends-out the information to the computer body 4 so as to, for example, make a printer driver provided in the computer body 4 to process the information. Further, the control circuit 50 receives print data from the printer driver provided in the computer body 4, and, in synchronism with movement of the paper-feed motor 43 and/or the carriage motor 42, outputs dot data to the drive buffer 56 at a predetermined timing.

Structure of Computer Body 4 Relating to Printing Process

Figure 7:
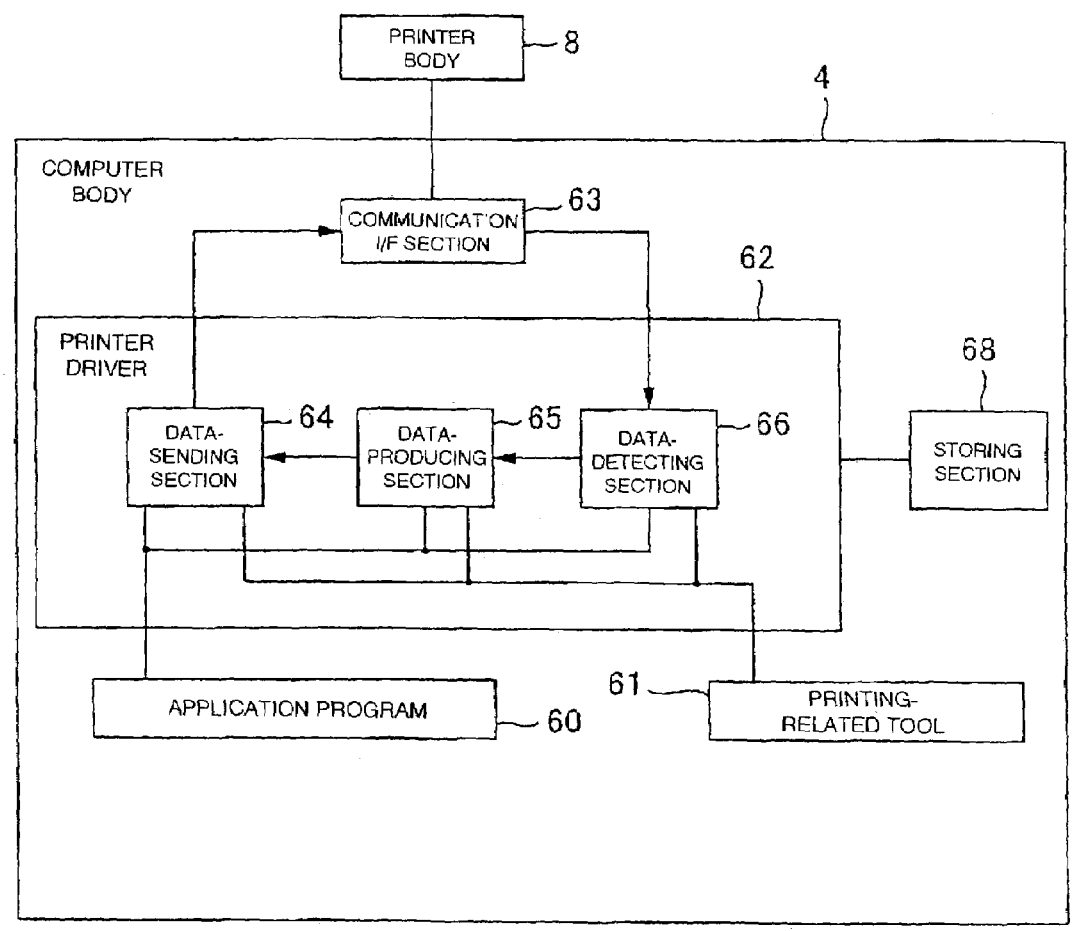
FIG. 7 is a schematic diagram showing the structure of a computer body 4 relating to the printing system.
Figure 8:
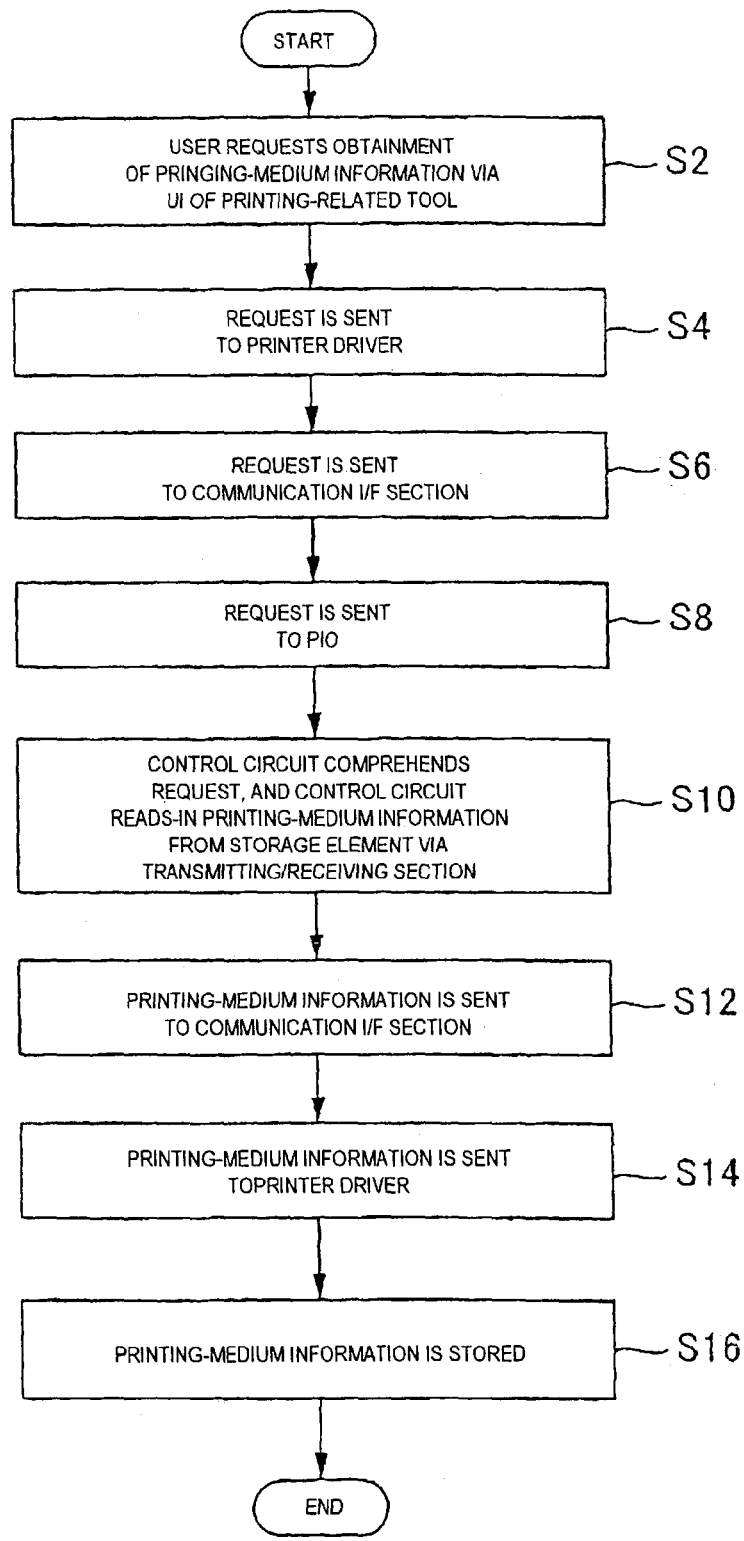
FIG. 8 is a flowchart showing the operations of the printing system 3 according to the embodiment.

Next, using FIG. 8, further explanation will be made of a structure, relating to a printing system, of the computer body 4 shown in FIG. 7. FIG. 8 is a schematic diagram showing the structure of the computer body 4 relating to the printing system.

The computer body 4 comprises: an application program 60; a tool 61 relating to printing; a printer driver 62; a communication interface (hereinafter referred to as "I/F") section 63; and a storing section 68. Further, the printer driver 62 comprises: a data-sending section 64; a data-producing section 65; and a data-detecting section 66.

As examples of the application program 60, there are, for example, document-creating software, drawing software, and spreadsheets. However, the program is not limited to the above. When a user instructs printing using the application program 60, data such as a document created with the application program 60 is input to the printer driver 62. The printer driver 62 produces, in the data-producing section 65, print data based on the data transferred from the application program 60.

The printing-related tool 61 is a kind of application program provided by, for example, the supplier of the printing system 3, and, for example, gives hints to the user for troubleshooting or carries out an optimal printing setting in a dialogical manner with the user. Basically, the input from the user is processed at the printer driver 62. The printer driver 62 encourages the user to make further inputs, and/or makes a notice of results. Here, as a matter of course, data exchange between the printer driver 62 and the printer body 8 is carried out appropriately.

The data-detecting section 66 obtains, for example, printing-medium information relating to the printing medium from the printer body 8 via the communication I/F section 63. According to the information, the data-producing section 65 carries out various settings necessary for printing, and also, produces print data based on the data transferred from the application program 60. These setting data and print data are sent along with other commands to the data-sending section 64, and then sent-out to the printer body 8 from the communication I/F section 63 via communication means.

Further, the storing section 68, such as a hard disk, is provided for, for example, storing printing-medium information relating to the printing medium and obtained from the printer body 8, and some other information.

Here, the communication means may be constructed in a wired manner or a wireless manner. Further, the configuration may be that several computer bodies 4 share one or several printer bodies 8.

Obtaining Printing-Medium Information

Figure 9:
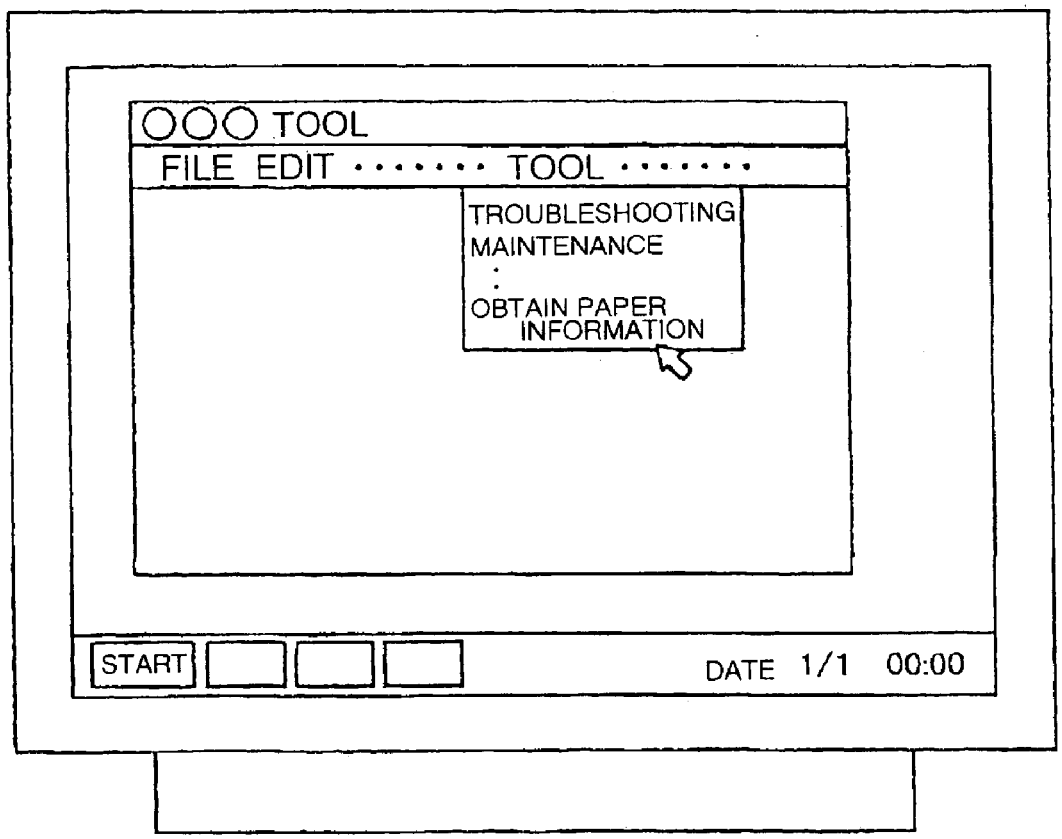
FIG. 9 is a diagram of an image of a user interface of the printing system 3 according to an embodiment.

Next, explanation will be made of operation of the printing system 3 according to an embodiment using FIG. 8 and FIG. 9, with reference to the figures already explained. FIG. 8 is a flowchart showing the operations of the printing system 3 according to the present embodiment. FIG. 9 is a diagram of an image of a user interface (hereinafter referred to as "UI") of the printing system 3 according to an embodiment.

Figure 10:
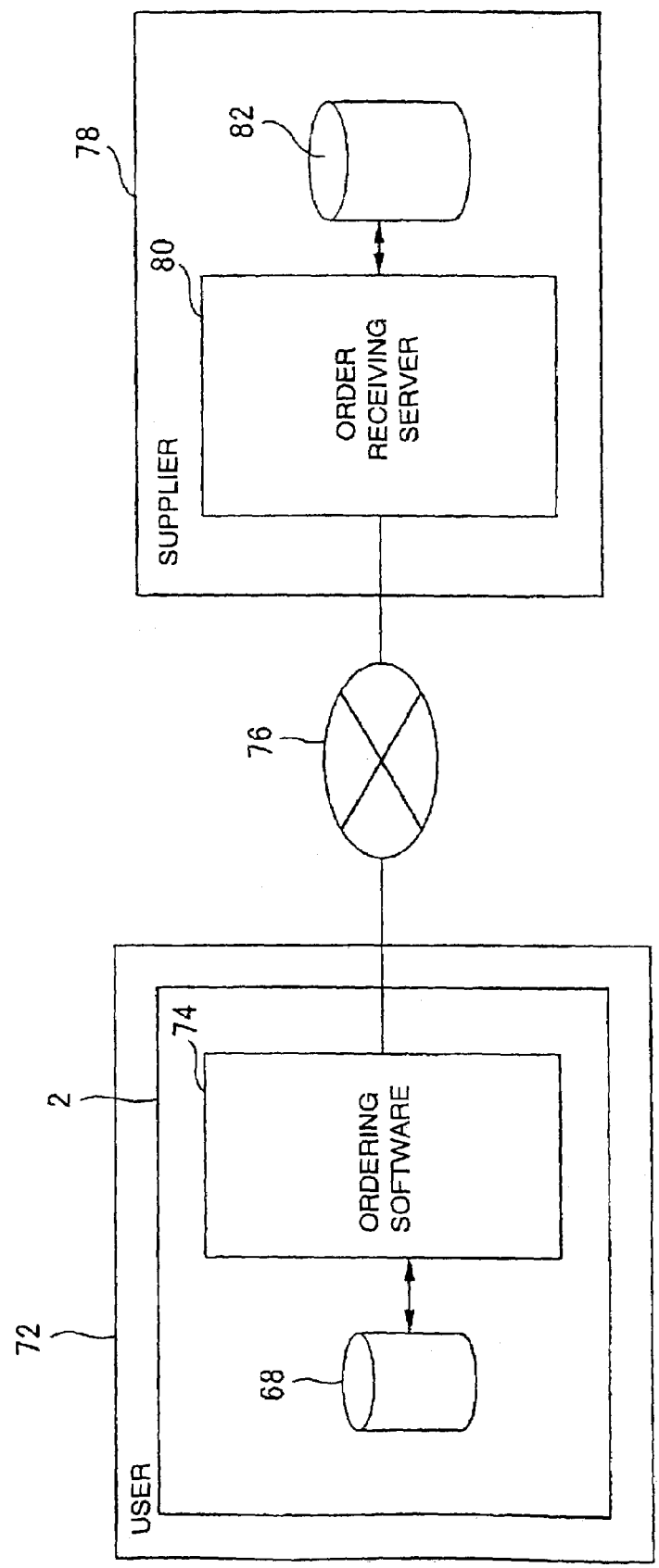
FIG. 10 is a schematic drawing showing a way of ordering a printing-medium unit according to an embodiment.

First, using the UI of the printing-related tool 61 displayed on the display device 6 of the printing system 3, the user 72 makes a request to obtain the printing-medium information, that is, to read-in the printing-medium information relating to the printing medium from the storage means provided on the printing-medium unit 9, send the information to the printing system 3, and save the information (step S2). As an example of the above, as shown in FIG. 10, the "OBTAIN PAPER INFORMATION" section is clicked with the mouse from among the menu of the printing-related tool 61. It may be made so that the user 72 can designate the location, such as a folder and a directory, for saving the information.

The printing-related tool 61 comprehends the present request, and a request requesting to obtain the above-mentioned printing-medium information is sent to the printer driver 62 (step S4). Further, this request is sent via the communication I/F section 63 (step S6), and to the input/output section for peripheral equipments (PIO) 54 of the printer body 8 (step S8).

Next, the control circuit 50 comprehends the request; and the control circuit 50 accesses the storage element 33 via the transmitting/receiving section 202, and reads-in the above-mentioned printing-medium information from the storage element 33 (step S10).

The read-in printing-medium information is sent to the computer body 4 by the control circuit 50. The computer body 4 first receives the above-mentioned printing-medium information at the communication I/F section 63 (step S12).

The printing-medium information is sent to the printer driver 62 (step S14). Finally, the information is stored in the storing section 68 in, for example, the location designated by the user 72 (step S16). Further, the above-mentioned printing-medium information may be displayed in the UI of the printing-related tool 61 displayed on the display device 6 of the printing system 3.

Note that, as for the above-mentioned operation for obtaining the printing-medium information, there was described a situation in which the user 72 used the mouse to click on the section showing "OBTAIN PAPER INFORMATION" from the menu of the printing-related tool 61 displayed on the display device 6 of the printing system 3. However, the operation is not to be limited to the above. For example, the printing-medium information may be obtained when the user 72 instructs printing with, for example, document-creating software, drawing software, or a spreadsheet, and stored in the storing section 68; or, the information may be obtained and stored upon carrying out troubleshooting relating to the printing medium or upon carrying out an optimal printing setting relating to the printing medium in a dialogical manner with the user 72, through the use of, for example, the above-mentioned printing tool 61.

Way of Ordering Printing-Medium Unit

Next, explanation will be made of a way of ordering a printing-medium unit according to an embodiment using FIG. 10, and with reference to the figures already explained. FIG. 10 is a schematic diagram showing a way of ordering a printing-medium unit according to an embodiment.

In FIG. 10, the printing system 3 that the user 72 uses and an order-receiving server 80 that a supplier 78 uses are connected through a telecommunication line 76 so as to enable mutual communication. Further, the printing system 3 comprises: later-explained ordering software (also referred to as order-sending program) 74 for ordering the printing-medium unit 9; and the above-mentioned storing section 68. Furthermore, the order-receiving server 80 can access a received-order-managing database 82 for managing data on orders from the user 72.

The ordering software 74 is software for accessing the order-receiving server 80 and ordering the printing-medium unit 9. A browser may be used as the ordering software 74, but it is not limited to the above. For example, the software may be such in which one or a plurality of plug-in software is added to the browser, or may be special-purpose software such as software supplied from the supplier 78. Furthermore, the ordering software 74 provided in the order-receiving server 80 may be sent-out to the printing system 3 through the telecommunication line 76, and made to operate in the printing system 3. Note that in the explanation below, explanation will be made taking a browser as an example of an embodiment of the ordering software 74.

Figure 11:
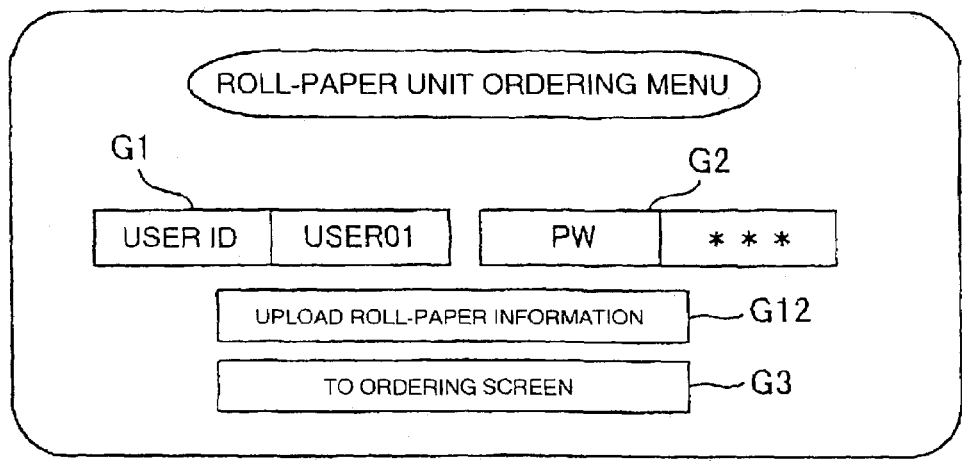
FIG. 11 is a schematic diagram showing an example of a display screen for ordering a printing-medium unit according to an embodiment.
Figure 11:
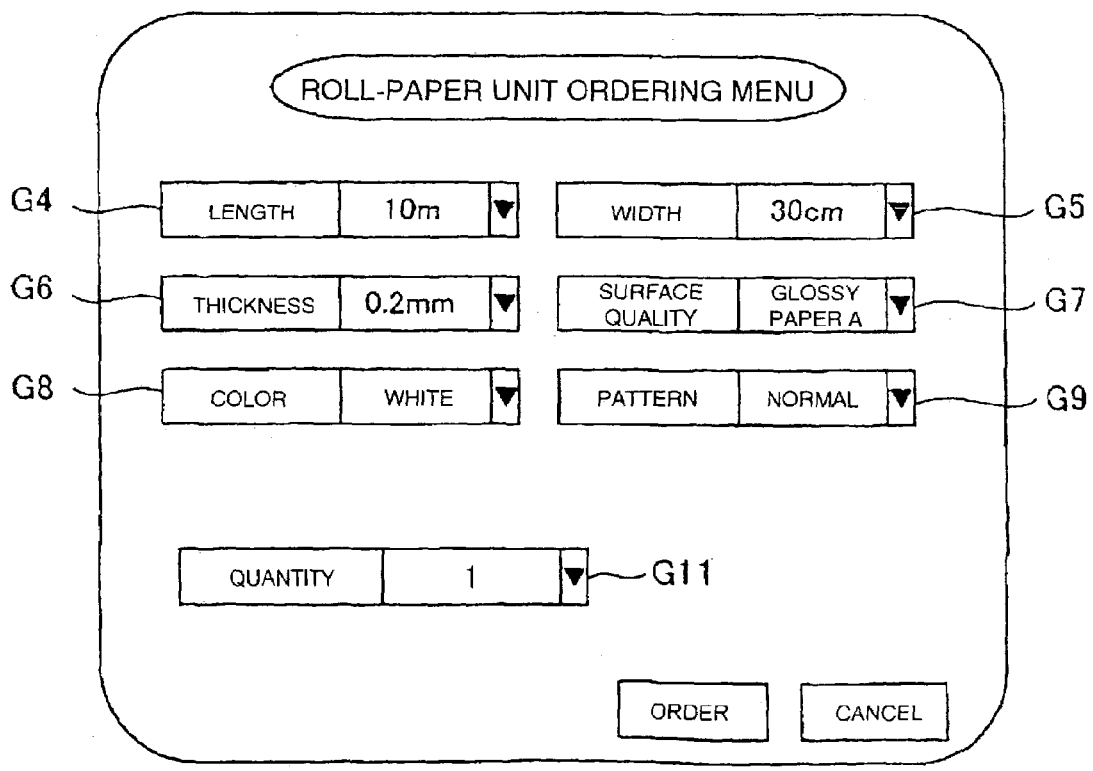
Figure 12:
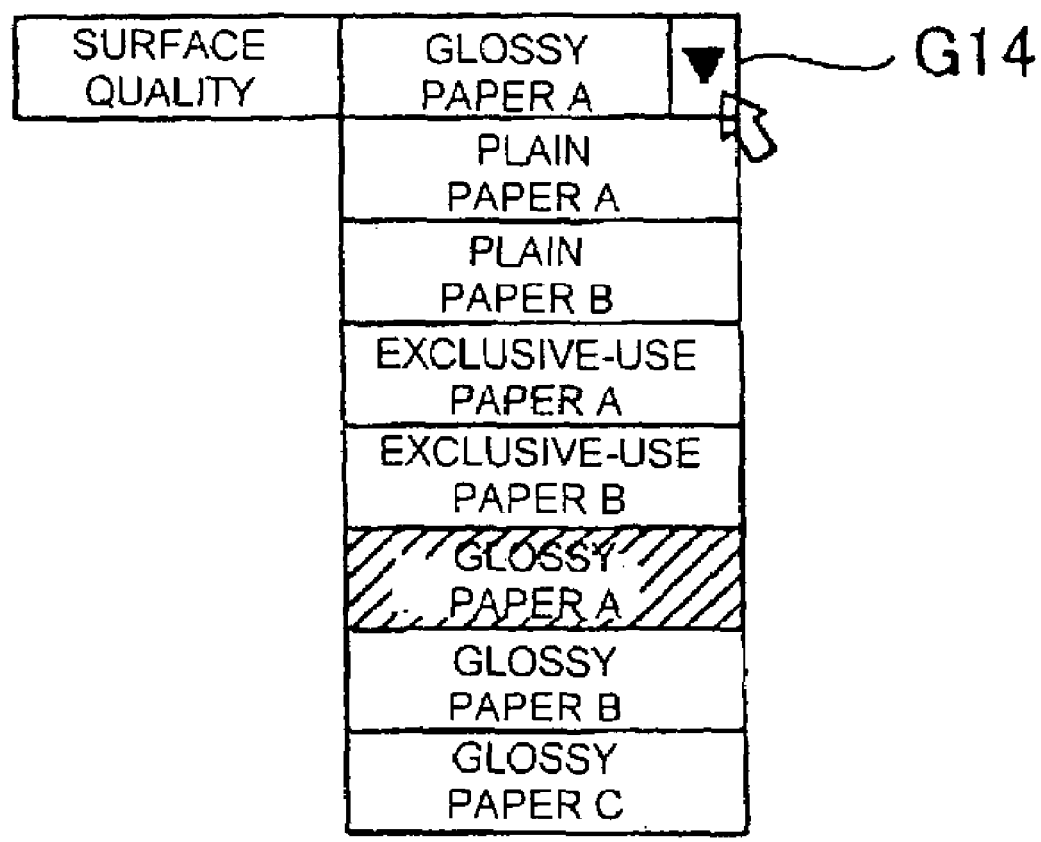
FIG. 12 is a schematic diagram showing a portion of FIG. 11 in further detail.

Next, explanation will be made of a display screen on ordering a printing-medium unit according to an embodiment using FIG. 11 and FIG. 12. FIG. 11 is a schematic diagram showing an example of a display screen on ordering a printing-medium unit according to an embodiment. FIG. 12 is a schematic diagram showing a portion of FIG. 11 in further detail.

In FIG. 11(a) shows a main menu for ordering a roll-paper unit, as an example of a printing-medium unit, and provided when the printing system 3 accesses the order-receiving server 80.

The user 72 is to input a predetermined ID and a password (PW) in a user-ID-input box GI and a password-input box G2. If ordering is desired, by clicking on the box shown as G3 with the mouse, it is possible to move to an ordering screen as shown in FIG. 11(b) after authorization according to the user ID and the password. Further, in the case of sending-out roll-paper information, as an example of printing-medium information stored in the storing section 68, by clicking on the box shown as G12 with the mouse, the information will be sent-out from the printing system 3 to the order-receiving server 80 after authorization according to the user ID and the password. Note that the above-mentioned actions relating to authorization are not always necessary and can be omitted.

The user 72 can select, for example, the specifications of the preferred roll paper through the ordering screen shown in FIG. 11(b). As for the specifications of the roll paper, there are, for example: the paper length; the paper width; the paper thickness; the paper-surface quality; the paper color; and the paper pattern. These can be selected in respective selecting boxes G4 through G8. Further, the user 72 may select the quantity of the roll-paper units to be ordered in a selecting box G9.

Next, explanation will be made of a method of the above-mentioned selecting using FIG. 12. As shown in G13, GLOSSY PAPER A is shown as initial data (herein referred to as default) in the selecting box relating to the surface quality of the roll paper. It is made so that the user 72 can click with the mouse on the arrow provided on the right of the selecting box relating to the surface quality of the roll paper, as in G13. When the arrow is clicked, as shown in G14, a list of providable options relating to the surface quality of the roll paper will be shown in a section therebeneath. Here, the default surface quality GLOSSY PAPER A will be shown in a highlighted manner, so as to attract the user's eyes. The user 72 can select a preferred surface quality by clicking with the mouse on a section relating to the surface quality from the above-mentioned list of options.

Note that in the above, it is described that the user 72 can select the preferred specifications etc. of the roll paper. However, instead of selecting the specifications etc., it may be made so that the specifications etc. can be inputted using, for example, a keyboard. Further, the above-mentioned selecting and inputting of the specifications etc. do not have to be carried out using an input device such as the keyboard and the mouse. For example, it is possible to adopt, for example, a voice-recognition system or an automatic-answering system, and the selecting/inputting may be inputted by voice.

Figure 13:
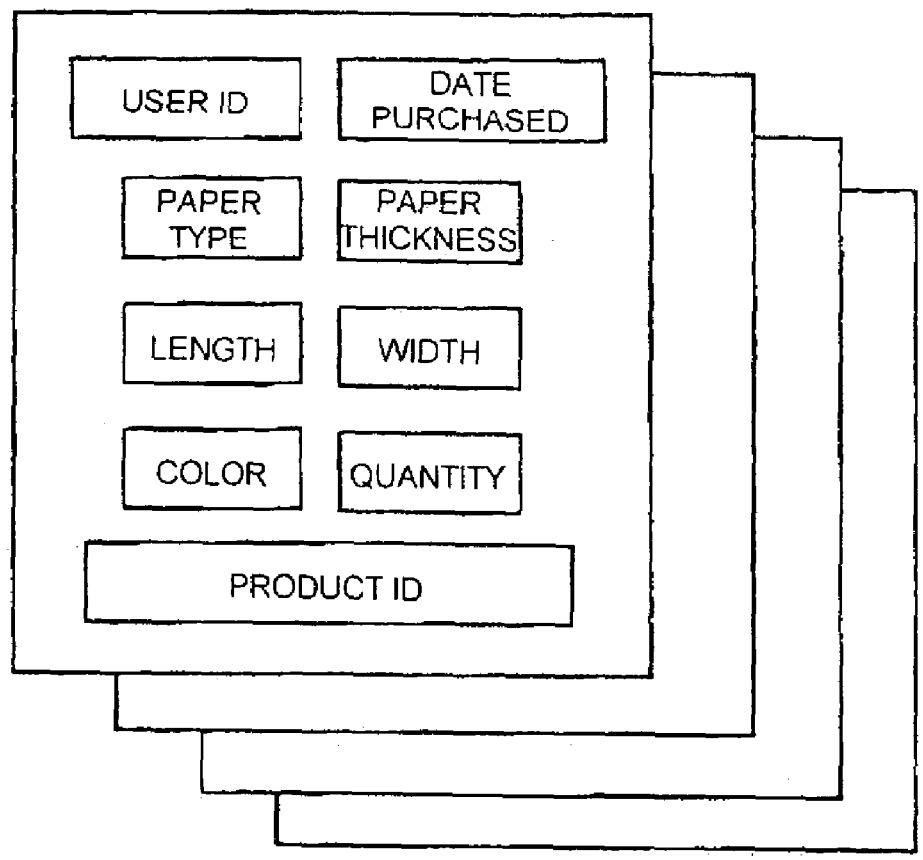
FIG. 13 is a schematic diagram of a received-order-managing database 82.

Next, further explanation will be made of the received-order-managing database 82 explained in FIG. 10, using FIG. 13. FIG. 13 is a schematic diagram showing an example of the received-order-managing database 82.

The received-order-managing database 82 is composed of a plurality of databases for every order. Each database is provided with entries on the user ID, the purchased date (date of ordering), the specifications such as the paper width, and the quantity, and pieces of information corresponding to the above-mentioned entries upon ordering are stored. Further, product ID may be provided as an entry, as explained later.

Ordering Procedure of Printing-Medium Unit

Figure 14:
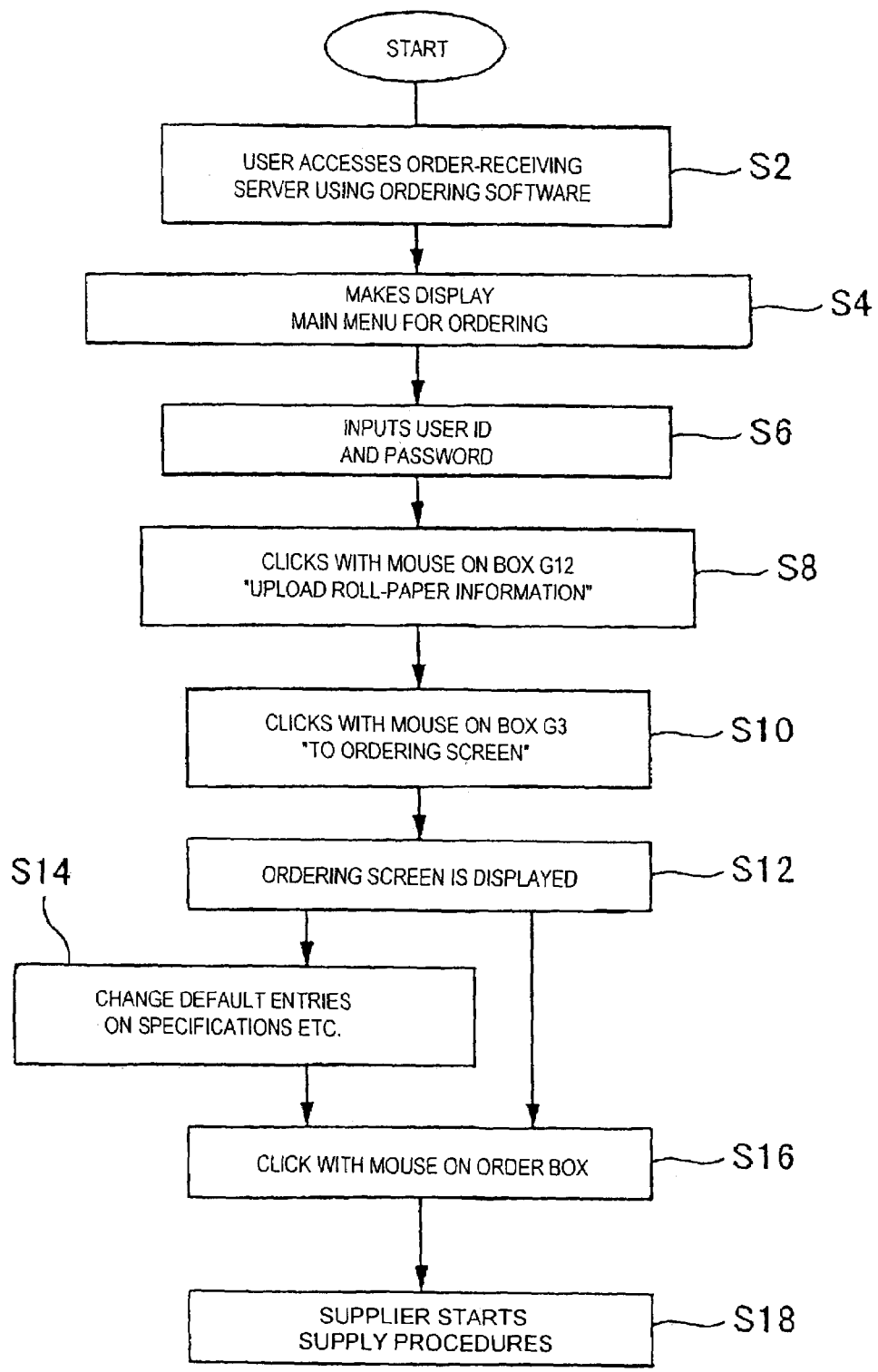
FIG. 14 is a flowchart showing a procedure of ordering a roll-paper unit.

Next, using FIG. 14, explanation will be made of an ordering procedure in which the user 72 makes an access to the order-receiving server 80 and orders a roll-paper unit, as an example of a printing-medium unit, through the telecommunication line 76 using the ordering software 74, with reference to the figures already explained. FIG. 14 is a flowchart showing a procedure of ordering a roll-paper unit.

First, the user 72 accesses the order-receiving server 80 of the supplier 78 using the ordering software 74 (step S2). This is carried out by, for example, designating a URL of a homepage of the supplier 78 from the browser installed in the printing system 3 that the user 72 is using, and accessing the site of the supplier 78.

Next, by following the links in the site of the supplier 78, the user 72 makes the display device 6 of the printing system 3 display the above-mentioned main menu for ordering (step S4).

Then, in the menu, the user 72 first inputs his/her user ID and password required for authorization by the supplier 78 (step S6). Then, the user sends-out roll-paper information, as an example of printing-medium information, to the order-receiving server 80 in order to enjoy the later-explained conveniences. This may be carried out by clicking with the mouse on a box showing "UPLOAD ROLL-PAPER INFORMATION" shown as G12 in FIG. 11 (step S8).

According to the above-mentioned operations, the printing-medium information stored in the storing section 68 will be sent-out to the order-receiving server 80 through the telecommunication line 76. Sending may be carried out using protocols such as FTP (File Transfer Protocol) and Telnet, but does not have to be limited to the above.

Note that the timing in which the printing-medium information is sent-out does not have to be limited to the above. For example, the timing may be when the box shown as G3 in FIG. 11 is clicked with the mouse, or when the ORDER box shown in FIG. 11 is clicked with the mouse.

Further, in the above description, the printing-medium information is temporarily stored in the storing section 68, read-in therefrom, and then sent-out to the order-receiving server 80. However, the information may directly be read-in from the above-mentioned storage element 33 and sent-out at any of the timings explained above.

The sent-out printing-medium information is received by the order-receiving server 80, and stored in the received-order-managing database 82.

As described above, by the printing-medium information stored in the storing section 68 being sent-out from the printing system 3 to the order-receiving server 80 through the telecommunication line 76, the supplier 78 having received the information from many users 72 can reflect the information to the menu for ordering.

For example, it will become possible to display, as default entries in the menu shown in FIG. 11(b), the entries of the specifications etc. in which many orders are received from the users 72. Further, it will become possible to place that entry in the upper section among the respective entries listed as entries relating to surface quality shown in G14 of FIG. 12. On the contrary, it may be possible to delete the entry in which only a few orders are received from the users 72, or place such entry in the lower section among the respective entries listed as entries relating to the surface quality shown in G14 of FIG. 12.

Accordingly, the user 72 will be relieved from being frustrated by the trouble of finding the option suiting the specifications etc. that he/she is expecting. Further, there arises a merit for the supplier 78 in that the supplier 78 can:

place the specifications etc. preferred by the users in a noticeable section; place those that are not in an unobtrusive section; or delete those from the object of products to be supplied. Furthermore, the supplier 78 can reexamine the production line so as to increase production of products of which the specifications etc. are gaining many orders from the users 72, and on the contrary, to reduce production of products of which the specifications etc. are obtaining only a few orders.

Note that in the above, reflection to the ordering menu is to be made based on the printing-medium information received from the many users 72. However, the reflection may be made based on the printing-medium information received from one user 72. That is, the above can be carried out based on a plurality of pieces of printing-medium information received from a user 72 specified by inputting of his/her user ID. For example, it is possible to display, as the default entries in the menu shown in FIG. 11(*b*), the entries such as the specifications that are frequently ordered or that have been ordered most recently by that user 72. Further, it is possible to place those entries at the upper section among the entries listed as the entries relating to the surface quality as shown in G14 of FIG. 12. On the contrary, it is possible to delete the entry on the specifications etc. that the user 72 has not ordered in the past. Further, it is possible to place that entry at the lower section among the entries listed as the entries relating to the surface quality as shown in G14 of FIG. 12, or to set a configuration so that the entry can not be selected even though the entry is displayed.

Further, it is possible to make the user designate a period relating to date, such as from Jun. 13, 1999 to Jul. 16, 2001, along with his/her user ID, and then make the above-mentioned operations be carried out within that range.

Further, it is possible to display the entries listed as the entries relating to the surface quality, as shown in G14 of FIG. 12, in the order that a certain user 72 made orders in the past.

Further, in consideration of the convenience of the user 72 when he/she is to order a roll-paper unit having similar specifications etc. as the specifications etc. of a roll paper that he/she ordered in the past, it is possible to, for example, provide a section for displaying a history of the past in the display screen shown in FIG. 11(*b*), and provide a function so that the history of the past will be displayed when the user 72 clicks that section with the mouse and that the user 72 is made to select the preferred roll-paper unit from those displayed.

Further, the above-mentioned effect is not to be limited to the case in which the user 72 makes an order using the printing system 3. For example, the entries of the specifications etc. gaining many orders from the users 72 may be shown in a noticeable position in, for example, a pamphlet; or the entries of the specifications etc. obtaining only a few orders from the users 72 may be deleted therefrom. Further, in the case where a user 72 is to make an order at, for example, a store, the supplier 78 can create, for example, an order form suitably structured according to the printing-medium information having been sent from that user, and the supplier can present that form.

As for the printing-medium information to be sent-out to the order-receiving server 80, there may be considered several patterns as follows. One example is a case where the information is specification information indicating the specifications of the printing medium; and another example is a case where the information is ID information, such as the above-explained product ID, for individually specifying the printing medium.

In the former case, since the specification information indicating the specifications of the printing medium is sent, there is an effect, not obtained by the latter, in that the supplier 78 that receives the information does not have to possess the present information in advance.

In the latter case, since the ID information for individually specifying the printing medium is sent, it becomes possible to reduce the information amount stored in the storing section 68 of the printing-medium unit 9, compared to the former case. The printing-medium units 9 are expendables that require exchanging when the printing medium provided thereon runs out; therefore, it is particularly advantageous, for reducing the unit price of the expendables, to reduce the information amount stored in the storing section 68. Furthermore, it becomes possible to reduce the information amount to be sent-out to the order-receiving server 80.

FIG. 14 is to be referred to again. The user 72 clicks with the mouse on the box "TO ORDERING SCREEN" shown as G3 in FIG. 11, in order to carry out further operations relating to ordering (step S10). In response, the ordering screen as shown in FIG. 11(*b*) will be displayed (step S12). The ordering screen is realized, for example, by: the order-receiving server 80 sending out screen-structuring data written in, for example, HTML (Hypertext Markup Language) or XML (Extensible Markup Language) to the printing system 3 through the telecommunication line 76; and the screen-structuring data being comprehended by the browser of the printing system 3 and being displaying by the display device 6.

Next, when focusing on G4 through G9 in the ordering screen, corresponding to the respective specifications such as the paper width, the entries relating to the specifications, such as 10*m*, are displayed as default entries.

This is realized by: the order-receiving server 80 sending-out, to the printing system 3, the screen-structuring data having the pieces of specification information, which have been sent-out from the printing system 3 to the order-receiving server 80, as default entries; and the browser of the printing system 3 that has received the data carrying out the above-mentioned displaying.

Further, in a case where the ID information, such as the product ID, is sent-out from the printing system 3 to the order-receiving server 80 instead of the specification information, the ID information is checked against the received-order-managing database 82, which associates and manages the ID information and the information on the specifications etc., and the associated information on the specification etc. is obtained, on an order-by-order basis. Then, the screen-structuring data containing this information as the default entries is sent-out to the printing system 3, and the above-mentioned displaying is realized by the browser of the printing system 3 that has received the data.

Accordingly, the user 72 will be free from the inconvenience in that he/she has to make a selection for each and every one of the plurality of kinds of options provided for the respective specifications of the plurality of kinds of roll paper.

FIG. 14 is to be referred to again. If the user 72 wants to order a roll paper having specifications etc. different from those of the roll paper currently being used, he/she changes the default entries, relating to the specifications etc., to other entries according to the method explained above (step S14), and then clicks on the ORDER box with the mouse (step S16). Further, if the user wants to order the roll paper having the same specifications etc. as those of the roll paper currently being used, he/she clicks on the ORDER box with the mouse without making any changes (step S16). According to the above operations, if the default entries are rewritten, information relating to the rewritten entries is sent to the order-receiving server 80, and if there was no rewriting, information indicative of this will be sent to the order-receiving server 80. Having received the information, the supplier 78 can start the supplying procedures of the roll-paper unit according to this information (step S18).

Accordingly, in the case where the user is to order a new roll-paper unit having the same specifications etc. as those of the roll paper currently being used, that is, the roll paper being set to the printing system 3, the user can make an order according to a simple method.

Further, for example, if the user is expecting a roll paper having specifications slightly different from those of the roll paper currently being used, it will be convenient for the user since he/she will have to change only the entries in which the specification is different.

Note that, in the above description, the ORDER box is to be clicked with the mouse if a roll paper having the same specifications etc. as those of the roll paper currently being used is to be ordered. However, it is possible to individually provide a section for ordering a roll paper having the same specifications etc. as those of the roll paper currently being used, and to make it possible to order the roll paper having the same specifications etc. as those of the one currently being used by clicking on that section. This section may be provided in the main menu shown in FIG. 11(*a*), or may be provided in the ordering screen shown in FIG. 11(*b*).

Further, in the above-mentioned cases, the section for showing the default entries of the respective specifications etc. as shown in FIG. 11(*b*) is not always necessary.

Further, all of the operations, for example, relating to the specifications are also applicable to the quantity of the roll-paper unit to be ordered. For example, the above-mentioned effects can be obtained by sending-out, from the printing system 3 to the order-receiving server 80, information relating to the quantity of the roll-paper unit recorded on the storage element 33. Further, the above-mentioned effect can also be obtained by presenting the quantity to the user as a default value, based on the above-mentioned information relating to the quantity that the order-receiving server 80 received.

Further, the above-explained ordering software 74, as the ordering-sending software, may be recorded in a computer-readable manner on various kinds of storage media, such as floppy disks and compact disks. The ordering software 74 recorded on the storage medium is read into the printing system 3 through, for example, the flexible disk drive device 11 or the CD-ROM drive device 12, and the printing system 3 is made to execute the above-explained various processes.

According to the present embodiment, it becomes possible to realize a printing system, an order-receiving server, an order-receiving system, an order-receiving method, an order-sending method, and a storage medium, capable of making it convenient for a person making an order upon ordering a printing-medium unit.

What is claimed is:

1. A printing system for printing on a printing medium, comprising:
   a printing-medium unit comprising:
      said printing mediums; and
      a memory, said memory having printing-medium information relating to said printing medium recorded thereon;
   wherein said printing system:
      reads-in said printing-medium information, and
      sends-out said printing-medium information to a telecommunication line towards an order-receiving server for receiving an order for said printing-medium unit,
   wherein said printing-medium unit is attachable/detachable to/from said printing system,
   wherein said printing-medium information is recorded on said memory before said printing-medium unit is attached to said printing system, and
   wherein said memory on which said printing-medium information has been recorded is attached, as a part of said printing-medium unit, to said printing system together with said printing medium.

2. A printing system according to claim 1, wherein said printing-medium information is specification information indicating a specification of said printing medium.

3. A printing system according to claim 2, wherein said printing system receives, from said order-receiving server through said telecommunication line, screen-structuring data of an ordering screen for ordering said printing-medium unit,
   said data
      being generated by said order-receiving server, and
      having, as initial data, said specification indicated by said specification information.

4. A printing system according to claim 3, wherein said initial data is rewritable, and
   wherein said printing system sends-out, to said telecommunication line towards said order-receiving server, either:
      rewritten data if said initial data has been rewritten, or
      information indicating that said initial data has not been rewritten if said initial data has not been rewritten.

5. A printing system according to claim 1, wherein said printing-medium information is ID information for individually specifying said printing medium.

6. A printing system according to claim 5, wherein
   said printing system receives, from said order-receiving server through said telecommunication line, screen-structuring data of an ordering screen for ordering said printing-medium unit,
   said screen-structuring data
      (1) being generated by said order-receiving server having specification information indicating a specification of said printing medium for every said ID information, and
      (2) having, as initial data, said specification corresponding to said ID information.

7. A printing system according to claim 6, wherein said initial data is rewritable, and
   wherein said printing system sends-out, to said telecommunication line towards said order-receiving server, either:
      rewritten data if said initial data has been rewritten, or
      information indicating that said initial data has not been rewritten if said initial data has not been rewritten.

8. An order-receiving server for receiving an order for a printing-medium unit, said server:
   receiving said order for said printing-medium unit which is attachable/detachable to/from a printing system, said printing-medium unit comprising:
      a printing-medium on which printing is carried out by said printing system, and
      a memory for recording printing-medium information relating to said printing medium and which is read into said printing system; and receiving said printing-medium information from said printing system through a telecommunication line, wherein said printing-medium information is recorded on said memory before said printing medium unit is attached to said printing system, wherein said memory on which said printing-medium information has been recorded is attached, as a part of said printing medium unit, to said printing system together with said printing medium, and wherein said printing medium information is specification information indicating a specification of said printing medium.

9. An order-receiving server according to claim 8, wherein
said order-receiving server:
generates screen-structuring data of an ordering screen for ordering said printing-medium unit, and
sends-out said screen-structuring data to said telecommunication line towards said printing system,
said screen-structuring data having, as initial data, said specification indicated by said specification information received from said printing system.

10. An order-receiving server according to claim 9, wherein
said order-receiving server receives, from said printing system through said telecommunication line, either
rewritten data if said initial data has been rewritten in said printing system, or
information indicating that said initial data has not been rewritten if said initial data has not been rewritten in said printing system.

11. An order-receiving server for receiving an order for a printing-medium unit, said server:
receiving said order for said printing-medium unit which is attachable/detachable to/from a printing system, said printing-medium unit comprising:
a printing-medium on which printing is carried out by said printing system, and
a memory for recording printing-medium information relating to said printing medium and which is read into said printing system; and
receiving said printing-medium information from said printing system through a telecommunication line,
wherein said printing-medium information is recorded on said memory before said printing medium unit is attached to said printing system,
wherein said memory on which said printing-medium information has been recorded is attached, as a part of said printing medium unit, to said printing system together with said printing medium, and
wherein said printing medium information is ID information for individually specifying said printing medium.

12. An order-receiving server according to claim 11, wherein
said order-receiving server
(1) has specification information indicating a specification of said printing medium for every said ID information,
(2) generates screen-structuring data of an ordering screen for ordering said printing-medium unit, said data having, as initial data, said specification corresponding to said ID information received from said printing system, and
(3) sends-out said screen-structuring data to said telecommunication line towards said printing system.

13. An order-receiving server according to claim 12, wherein
said order-receiving server receives, from said printing system through said telecommunication line, either
rewritten data if said initial data has been rewritten in said printing system, or
information indicating that said initial data has not been rewritten if said initial data has not been rewritten in said printing system.

14. An order-receiving system for a printing-medium unit, comprising:
a printing system for printing on a printing medium, wherein
(1) said printing-medium unit is attachable/detachable to/from said printing system, said unit comprising said printing medium and a memory,
(2) said printing system reads-in printing-medium information relating to said printing medium and recorded on said memory,
(3) said printing system carries out printing on said printing medium, and
(4) said printing system sends-out said printing-medium information to a telecommunication line towards an order-receiving server for receiving an order for said printing-medium unit; and
said order-receiving server for receiving said printing-medium information from said printing system through said telecommunication line,
wherein said printing-medium information is recorded on said memory before said printing-medium unit is attached to said printing system, and
wherein said memory on which said printing-medium information has been recorded is attached, as a part of said printing-medium unit, to said printing system together with said printing medium.

15. A method of receiving an order for a printing-medium unit, said method comprising the steps of:
a printing system for printing on a printing medium sending-out printing-medium information to a telecommunication line towards an order-receiving server for receiving an order for said printing-medium unit, wherein
(1) said printing-medium unit is attachable/detachable to/from said printing system, said unit comprising said printing medium and a memory,
(2) said printing system reads-in said printing-medium information relating to said printing medium and recorded on said memory, and
(3) said printing system carries out printing on said printing medium; and
said order-receiving server receiving said printing-medium information from said printing system through said telecommunication line,
wherein said printing-medium information is recorded on said memory before said printing-medium unit is attached to said printing system, and
wherein said memory on which said printing-medium information has been recorded is attached, as a part of said printing-medium unit, to said printing system together with said printing medium.

16. A method of sending an order for a printing-medium unit, said method comprising the steps of:
a printing system for printing on a printing medium
reading-in printing-medium information relating to said printing medium and recorded on a memory provided on said printing-medium unit; and sending-out said printing-medium information to a telecommunication line towards an order-receiving server for receiving an order for said printing-medium unit, wherein said printing-medium unit is attachable/detachable to/from said printing system, wherein said printing-medium information is recorded on said memory before said printing-medium unit is attached to said printing system, and wherein said memory on which said printing-medium information has been recorded is attached, as a part of said printing-medium unit, to said printing system together with said printing medium.

17. A method of sending an order according to claim 16, wherein said printing-medium information is specification information indicating a specification of said printing medium.

18. A method of sending an order according to claim 16, wherein said printing-medium information is ID information for individually specifying said printing medium.

19. A computer readable storage medium, comprising an order sending program for sending an order for a printing-medium unit stored thereon in a computer-readable manner, said order-sending program making a printing system execute the following steps of:

said printing system for printing on a printing medium reading-in printing-medium information relating to said printing medium and recorded on a memory provided on said printing-medium unit; and sending-out said printing-medium information to a telecommunication line towards an order-receiving server for receiving an order for said printing-medium unit, wherein said printing-medium unit is attachable/detachable to/from said printing system, wherein said printing-medium information is recorded on said memory before said printing-medium unit is attached to said printing system, and wherein said memory on which said printing-medium information has been recorded is attached, as a part of said printing-medium unit, to said printing system together with said printing medium.

20. A storage medium according to claim 19, wherein said printing-medium information is specification information indicating a specification of said printing medium.

21. A storage medium according to claim 20, wherein said order-sending program further makes said printing system execute the following step of:

said printing system receiving, from said order-receiving server through said telecommunication line, screen-structuring data of an ordering screen for ordering said printing-medium unit, said data being generated by said order-receiving server, and having, as initial data, said specification indicated by said specification information.

22. A storage medium according to claim 21, wherein said initial data is rewritable, and said order-sending program further makes said printing system execute the following step of:

said printing system sending-out, to said telecommunication line towards said order-receiving server, either rewritten data if said initial data has been rewritten, or information indicating that said initial data has not been rewritten if said initial data has not been rewritten.

23. A storage medium according to claim 19, wherein said printing-medium information is ID information for individually specifying said printing medium.

24. A storage medium according to claim 23, wherein said order-sending program further makes said printing system execute the following step of:

said printing system receiving, from said order-receiving server through said telecommunication line, screen-structuring data of an ordering screen for ordering said printing-medium unit, said screen-structuring data (1) being generated by said order-receiving server having specification information indicating a specification of said printing medium for every said ID information, and (2) having, as initial data, said specification corresponding to said ID information.

25. A storage medium according to claim 24, wherein said initial data is rewritable, and said order-sending program further makes said printing system execute the following step of:

said printing system sending-out, to said telecommunication line towards said order-receiving server, either rewritten data if said initial data has been rewritten, or information indicating that said initial data has not been rewritten if said initial data has not been rewritten.

* * * * *